United States Patent
Lee et al.

(10) Patent No.: US 9,196,212 B2
(45) Date of Patent: Nov. 24, 2015

(54) 3D IMAGE DISPLAY DEVICE

(71) Applicant: LG Display Co., Ltd., Seoul (KR)

(72) Inventors: Youngbok Lee, Goyang-si (KR); Taeyoung Heo, Seoul (KR)

(73) Assignee: LG Display Co., Ltd., Seoul (KR)

( * ) Notice: Subject to any disclaimer, the term of this patent is extended or adjusted under 35 U.S.C. 154(b) by 52 days.

(21) Appl. No.: 14/107,266

(22) Filed: Dec. 16, 2013

(65) Prior Publication Data

US 2015/0085001 A1    Mar. 26, 2015

(30) Foreign Application Priority Data

Sep. 23, 2013 (KR) .......... 10-2013-0112804

(51) Int. Cl.
    *G09G 3/36* (2006.01)
    *G09G 3/00* (2006.01)
    *H04N 13/04* (2006.01)

(52) U.S. Cl.
    CPC ............. *G09G 3/3696* (2013.01); *G09G 3/003* (2013.01); *H04N 13/0404* (2013.01); *H04N 13/0452* (2013.01); *G09G 2300/023* (2013.01)

(58) Field of Classification Search
CPC ............ G09G 3/3696; G09G 3/003; G09G 2300/023; G09G 5/00; G09G 2330/021; G09G 2330/06; G09G 2340/0492; G09G 2370/16
USPC .............. 345/156, 419, 77–89, 653–654, 345/664–665, 679–680; 349/96; 348/54
See application file for complete search history.

(56) References Cited

U.S. PATENT DOCUMENTS

| | | | |
|---|---|---|---|
| 2010/0238276 A1* | 9/2010 | Takagi et al. | 348/54 |
| 2011/0084961 A1* | 4/2011 | Son et al. | 345/419 |
| 2011/0304530 A1* | 12/2011 | Yeh et al. | 345/156 |
| 2013/0107174 A1* | 5/2013 | Yun et al. | 349/96 |

* cited by examiner

*Primary Examiner* — Md Saiful A Siddiqui
(74) *Attorney, Agent, or Firm* — Fenwick & West LLP

(57) ABSTRACT

Provided is a 3D image display device, including: a display panel displaying an image; a lens panel positioned on the display panel and has layers formed of different materials, refractive indexes of the layers being varied according to a driving voltage supplied from the outside; and a lens panel driver supplying the driving voltage to the lens panel.

7 Claims, 7 Drawing Sheets

(a)

(b)

(a)

(b)

3D IMAGE DISPLAY DEVICE

This application claims the benefit of Korean Patent Application No. 10-2013-0112804 filed on Sep. 23, 2013, which is hereby incorporated by reference.

BACKGROUND

1. Field

The present invention relates to a three-dimensional (3D) image display device.

2. Description of the Related Art

With the development of information technology, the market of display devices, which are the connection media between a user and information, are growing. Thus, display devices, such as a Liquid Crystal Display (LCD), an Organic Light Emitting-Diode Display (OLED), an Electrophoretic Display (EPD), a Plasma Display Panel (PDP), and the like, have been increasingly used.

Some of the above-described display devices are implemented as a three-dimensional (3D) image display device. 3D image display devices are classified into a stereoscopic technique and an autosteroscopic technique.

The stereoscopic technique uses parallax images of left and right eyes that have a large 3D effect. The stereoscopic technique is divided into a glasses method and a glasses-free method, both of which have been put to practical use.

In the related art, the glasses-free method changes a light path by using a fixed lens array such as a lenticular sheet. However, this method has a disadvantage in that it is impossible to switch between a two-dimensional (2D) image and a 3D image. For solving the disadvantage, glasses-free methods capable of switching between a 2D image and a 3D image, such as a liquid crystal filing method, a liquid crystal lens method, and a polarizing lens method, have been researched and commercialized.

However, when the liquid crystal filing method, the liquid crystal lens method, or the polarizing lens method is applied to a display device that does not emit a polarization light source, a double structure needs to be employed or a particular structure needs to be added to the display device, and thus a single 3D optical system cannot be employed. Therefore, improvements of the methods are required.

SUMMARY

According to an aspect of the present invention, there is provided a 3D image display device, including: a display panel displaying an image; a lens panel positioned on the display panel and has layers formed of different materials, refractive indexes of the layers being varied according to a driving voltage supplied from the outside; and a lens panel driver supplying the driving voltage to the lens panel.

According to another aspect of the present invention, there is provided a 3D image display device, including: a display panel displaying an image; a lens panel positioned on the display panel, the lens panel being composed of materials of which refractive indexes are varied by an oxidation-reduction reaction; and a lens panel driver supplying the driving voltage to the lens panel to induce the oxidation-reduction reaction.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION OF PREFERRED EMBODIMENTS

Reference will now be made in detail embodiments of the invention examples of which are illustrated in the accompanying drawings.

Hereinafter, specific embodiments of the present invention will be described with reference to the accompanying drawings.

Figure 1:
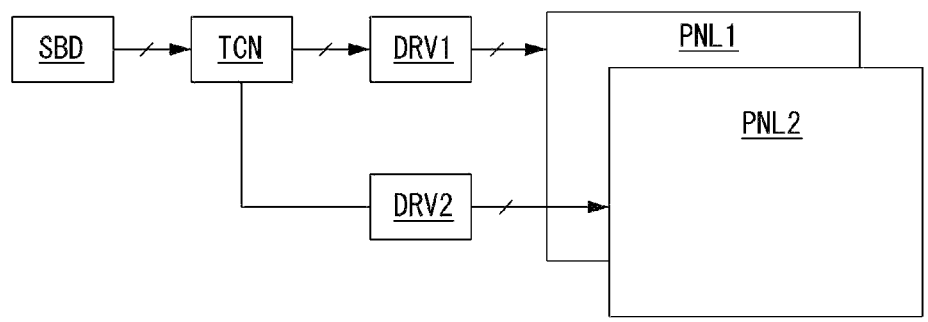
FIG. 1 is a schematic block diagram of a 3D display device according to an embodiment of the present invention.
Figure 2:
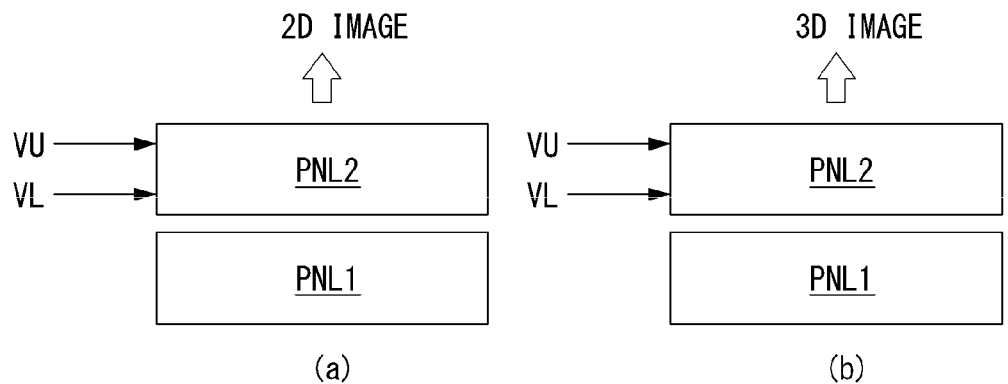
FIG. 2 illustrates a driving concept of the 3D image display device of FIG. 1.

FIG. 1 is a schematic block diagram of a 3D display device according to an embodiment of the present invention; and FIG. 2 illustrates a driving concept of the 3D image display device of FIG. 1.

As shown in FIG. 1, a 3D image display device according to an embodiment of the present invention includes an image supplier SBD, a timing controller TCN, a display panel driver DRV1, a lens panel driver DRV2, a display panel PNL1, and a lens panel PNL2. The 3D image display device according to an embodiment of the present invention is implemented in a glasses-free manner.

The image supplier SBD supports a two-dimensional mode (hereinafter, 2D mode), a three-dimensional mode (hereinafter, 3D mode), or a 2D and 3D mode. The image supplier SBD generates 2D image frame data in a 2D mode, 3D image frame data in a 3D mode, and 2D and 3D image frame data in a 2D and 3D mode. The 3D image frame data generally includes left-eye image frame data and right-eye image frame data.

The image supplier SBD supplies timing signals such as a vertical synchronization signal, a horizontal synchronization signal, a data enable signal, a main clock signal, and image frame data to the timing controller TCN. The image supplier SBD selects the 2D, 3D, or 2D and 3D mode in response to the user's selection input through a user interface, generates image frame data or the like corresponding to the selected mode, and supplies the image frame data to the timing controller TCN. The user interface includes user input units, such as an On Screen Display (OSD), a remote control, a keyboard, a mouse, and the like.

The timing controller TCN receives 2D image frame data, 3D image frame data, or 2D and 3D image frame data from the image supplier SBD. When the 2D mode is selected by the user input unit, the timing controller TCN supplies the 2D image frame data to the display panel driver DRV1 at a frame frequency of 50 Hz~60 Hz or the like. When the 3D mode is selected by the user input unit, the timing controller TCN supplies left-eye image frame data and right-eye image frame data to the display panel driver DRV1 at a frame frequency of 120 Hz or higher. In addition, the timing controller TCN supplies various kinds of control signals corresponding to the image frame data to the display panel driver DRV1.

The display panel driver DRV1 includes a data driver connected to data lines of the display panel PNL1 to supply data signals to the data lines, and a scan driver connected to scan lines of the display panel PNL1 to supply scan signals to the scan lines. The data driver included in the display panel driver DRV1 converts digital frame data into analog frame data under the control of the timing controller TCN, and supplies the analog frame data to the data lines of the display panel PNL1. In addition, the scan driver included in the display panel driver DRV1 sequentially supplies the scan signals to the scan lines of the display panel PNL1 under the control of the timing controller TCN.

The display panel PNL1 receives the scan signals and the data signals from the display panel driver DRV1 to display a 2D image, a 3D image, or 2D and 3D images in response to the signals. In the display panel PNL1, a first substrate and a second substrate have different constitutions according to characteristics of elements formed therein. However, the present invention may be applied to both a display panel to which a polarizing plate is attached to thereby emit a polarized light and a display panel to which a polarized plate is not attached to thereby emit a non-polarized light, and specific examples thereof will be later described.

As shown in FIG. 2, the lens panel driver DRV2 supplies driving voltages VL and VU to the lens panel PNL2. The lens panel driver DRV2 supplies driving voltages VL and VU to lower and upper electrodes of the lens panel PNL2, the driving voltages VL and VU being generated inside or outside the lens panel driver DRV2 under the control of the timing controller TCN. The driving voltages VL and VU supplied to the lower and upper electrodes may be synchronized or non-synchronized with signals output from the display panel driver DRV1. The lens panel driver DRV2 outputs first and second driving voltages VL and VU having the same electric potential or first and second driving voltages VL and VU having different electric potentials, under the control of the timing controller TCN.

The lens panel PNL2 uses a conductive polymer and an electrolyte material, which actively vary the refractive index thereof by the driving voltages VL and VU supplied from the outside. The lens panel PNL2 receives the driving voltages VL and VU from the lens panel driver DRV2 to display a 2D image, a 3D image, or 2D and 3D images in response to the driving voltages. The refractive indexes of the materials formed inside the lens panel PNL2 are varied according to the voltage difference between the driving voltages VL and VU supplied to the lower and upper electrodes. Specific descriptions associated with the lens panel PNL2 will be set forth as follows.

Hereinafter, the present invention will be described in detail with reference to cross-sectional views of the lens panel.

Figure 3:
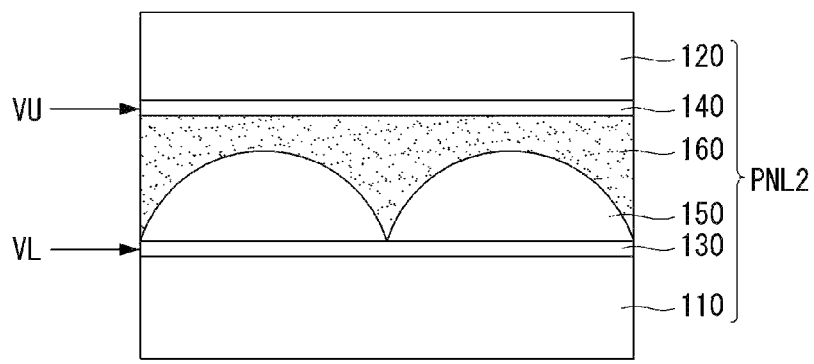
FIG. 3 is a cross-sectional view of a lens panel.
Figure 4:
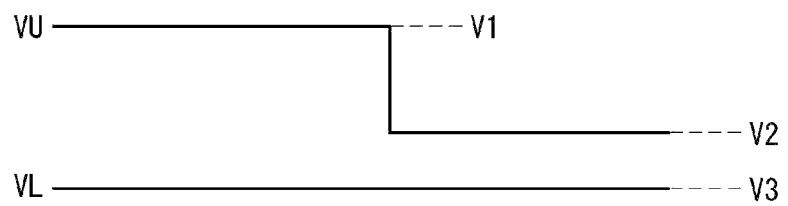
FIG. 4 illustrates a first exemplary view of driving voltages supplied to a lens panel.
Figure 4:
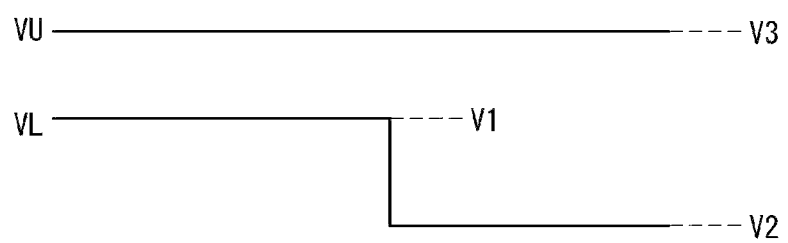
Figure 5:
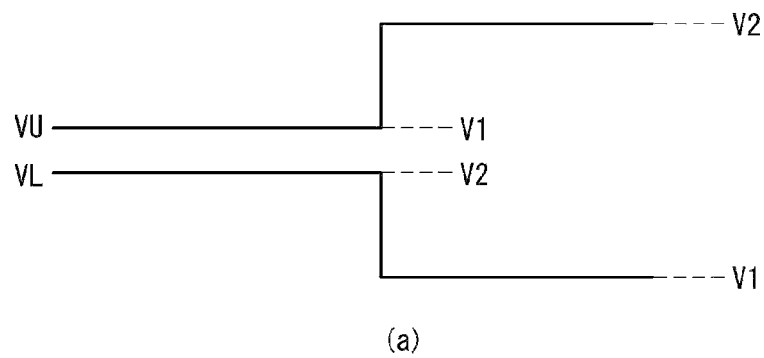
FIG. 5 illustrates a second exemplary view of driving voltages supplied to a lens panel.
Figure 6:
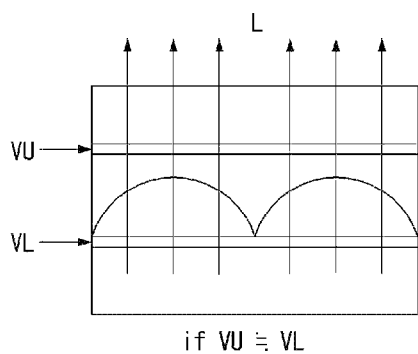
FIG. 6 illustrates light transmissive characteristics of a lens panel according to the driving voltage.
Figure 6:
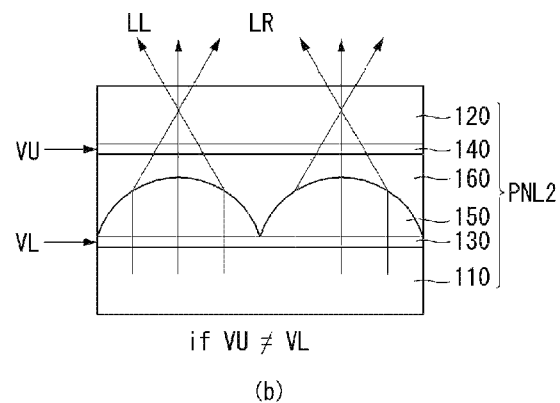

FIG. 3 is a cross-sectional view of a lens panel; FIG. 4 illustrates a first exemplary view of driving voltages supplied to a lens panel; FIG. 5 illustrates a first exemplary view of driving voltages supplied to a lens panel; and FIG. 6 illustrates light transmissive characteristics of a lens panel according to the driving voltage.

As shown in FIG. 3, a lens panel PNL2 includes a lower substrate 110, an upper substrate 120, a lower electrode 130, an upper electrode 140, a lens layer 150, and an electrolyte layer 160.

The lower substrate 110 and the upper substrate 120 each may be a glass or a film of a material giving flexibility and having excellent restoring force, such as at least one selected from polyestersulfone (PES), polyethylene terephthalate (PET), polyethylene naphthalate (PEN), polyimide (PI), and polycarbonate (PC), but are not limited thereto.

The lower electrode 130 is formed on the lower substrate 110, and the upper electrode 140 is formed on the upper substrate 120. The lower electrode 130 and the upper electrode 140 face each other inside the lens panel PNL2. A first driving voltage VL is supplied to the lower electrode 130 and a second driving voltage VU is supplied to the upper electrode 140. The lower electrode 130 and the upper electrode 140 may be formed of a transparent conductive film of, for example, Indium Tin Oxide (ITO), Indium Zinc Oxide (IZO), Indium Tin Zinc Oxide (ITZO), Zinc Oxide (ZnO), Indium Gallium Zinc Oxide (IGZO), or graphene. Besides, at least one of the lower electrode 130 and the upper electrode 140 may be formed as a multi-layered electrode made of a laminate of transparent oxide/metal/transparent oxide. Since the multi-layered electrode expresses a surface plasmon effect to have a high light transmittance and a low resistivity, the multi-layered electrode can be applied when the lens panel PNL2 is implemented to have a medium or large size.

The lens layer 150 is formed on the lower electrode 130. The lens layer 150 employs a conductive polymer, which can cause a reversible oxidation-reduction reaction with the electrolyte material of the electrolyte layer 160 when a particular voltage is applied thereto. An example of the conductive polymer constituting the lens layer 150 may be poly(3-hexylthiophene), but any material that can cause an oxidation-reduction reaction with the electrolyte material as described above may be used. The lens layer 150 may be imprinted as a lenticular shape by using a soft mold. However, any manner in which the conductive polymer is formed as a lenticular shape, such as extrusion molding, injection molding, or the like may be employed.

The electrolyte layer 160 is formed on the lens layer 150. The electrolyte layer 150 employs an electrolyte material, which can cause a reversible oxidation-reduction reaction with the conductive polymer of the lens layer 150 when a particular voltage is applied thereto. The electrolyte layer 160 planarizes an upper portion of the lens layer 150. The electrolyte material constituting the electrolyte layer 160 fills between the lower substrate 110 and the upper substrate 120 that are bonded to each other. As the electrolyte material constituting the electrolyte layer 160, a material that has a lower refractive index (n) than the conductive polymer constituting the lens layer 150 may be selected. The electrolyte material constituting the electrolyte layer 160 may be a solution type. The electrolyte material may be formed by being injected between the lower substrate 110 and the upper substrate 120 that are bonded to each other, but is not limited thereto.

As shown in (a) of FIG. 4, the second driving voltage VU supplied to the upper electrode 140 is set to swing between a first potential V1 and a second potential V2, and the first driving voltage VL supplied to the lower electrode 130 is set to be maintained at a third potential V3. The second potential V2 of the second driving voltage VU is similar or equal (equipotential) to the third potential V3 of the first driving voltage VL. When the second driving voltage VU has the first potential V1, a voltage difference is generated between the first driving voltage VL and the second driving voltage VU. In this case, the lens layer 150 and the electrolyte layer 160 have different refractive indexes.

As shown in (b) of FIG. 4, the second driving voltage VU supplied to the upper electrode 140 is set to be maintained at the third potential V3 and the first driving voltage VL supplied to the lower electrode 130 is set to swing between the first potential V1 and the second potential V2. The third potential V3 of the second driving voltage VU is similar or equal (equipotential) to the first potential V1 of the first driving voltage VL. When the first driving voltage VU has the second potential V2, a voltage difference is generated between the first driving voltage VL and the second driving voltage VU. In this case, the lens layer 150 and the electrolyte layer 160 have different refractive indexes.

As can be seen from FIG. 4, the lens panel is in a 3D mode when the voltage difference between the first driving voltage VL and the second driving voltage VU is generated, and in a 2D mode when the voltage difference between the first driving voltage VL and the second driving voltage VU is not generated.

In FIG. 4, the first driving voltage VL and the second driving voltage VU are set such that the voltage difference therebetween is ±0.1V or higher (preferably, a voltage difference of ±1V or higher). However, when the voltage difference between the first driving voltage VL and the second driving voltage VU exceeds a particular range, the electrolyte material constituting the electrolyte layer may be decomposed. Thus, it is preferable to consider this.

The descriptions with reference to FIG. 4 are for illustrating an exemplary case where the second driving voltage VU supplied to the upper electrode 140 swings within a particular range and the first driving voltage VL supplied to the lower electrode 130 is maintained at a particular voltage. However, these descriptions are merely for one exemplary case. Thus, the second voltage VU supplied to the upper electrode 140 may be set to be maintained at a particular voltage and the first driving voltage VL supplied to the lower electrode 130 may be set to swing within a particular voltage range.

Examples of the first and second driving voltages supplied to the lens panel are as shown in Table 1 below.

TABLE 1

| Classification | First and second driving voltages | |
| --- | --- | --- |
|  | 2D mode | 3D mode |
| Conductive polymer | +2 V(off) | −2 V(on) |
| Electrolyte material | +2 V(off) | +2 V(off) |

As described above, the lens panel can allow conversion between the 2D mode and the 3D mode by using a principle that a difference in the refractive index between the conductive polymer and the electrolyte material is generated according to the voltage difference between the first driving voltage and the second driving voltage.

Meanwhile, when the lens panel continuously displays images in a 3D mode, the lens panel driver may be exposed to bias stress since the lens panel driver DRV2 needs to implement outputting while maintaining a particular voltage. For solving this disadvantage, the first and second driving voltages VL and VU may be varied as follows only in a 3D mode.

As shown in (a) of FIG. 5, the second driving voltage VU supplied to the upper electrode 140 swings in a sequence of the first potential V1 and the second potential V2, and the first driving voltage VL supplied to the lower electrode 130 swings in a sequence of the second potential V2 and the first potential V1.

As shown in (b) of FIG. 5, the second driving voltage VU supplied to the upper electrode 140 swings in a sequence of the second potential V2 and the first potential V1, and the first driving voltage VL supplied to the lower electrode 130 swings in a sequence of the first potential V1 and the second potential V2.

In order to output the driving voltages shown in FIG. 5, the lens panel driver DRV2 may form the voltage difference in a manner in which the first and second driving voltages VL and VU are switched by the frame unit of at least N (N is an integer of 1 or greater). In this case, since the lens panel driver DRV2 need not implement outputting while maintaining any one voltage, the bias stress at an output terminal can be reduced. Therefore, the image displayed in a 3D mode can maintain a stabilized display quality.

As shown in (a) of FIG. 6, if the second voltage VU supplied to the upper electrode 140 is similar or equal to the first driving voltage VL supplied to the lower electrode 130 (if VU≈VL), the light incident to the lens panel PNL2 is emitted in a linear direction L. The reason is that since the refractive index of the lens layer 150 is similar or equal to the refractive index of the electrolyte layer 160, the lens layer 150 and the electrolyte layer 160 seems to be the same medium from a position of the incident light. Therefore, if the first driving voltage VL and the second driving voltage VU are supplied to be similar or equal (if VU≈VL), the lens panel PNL2 is operated in a 2D mode.

As shown in (b) of FIG. 6, if the second voltage VU supplied to the upper electrode 140 is different from the first driving voltage VL supplied to the lower electrode 130 (if VU≠VL), the light incident to the lens panel PNL2 is refracted and emitted in a first direction LL and a second direction LR. The reason is that since the refractive index of the lens layer 150 is different from the refractive index of the electrolyte layer 160, the lens layer 150 and the electrolyte layer 160 are different media from a position of the incident light. Therefore, if the first driving voltage VL and the second driving voltage VU are supplied to be different from each other (if VU≠VL), the lens panel PNL2 is operated in a 3D mode.

Meanwhile, when the lens layer 150 of the lens panel PNL2 is formed of poly(3-hexylthiophene) (hereinafter, abbreviated as P3HT), the refractive index (n) relationship between materials constituting the lens layer 150 and the electrolyte layer 160 may be expressed by "n of P3HT≠n of electrolyte, and n of P3HT2+≈n of electrolyte"

Hereinafter, shapes of the lower electrode and the upper electrode constituting the lens panel will be described.

Figure 7:
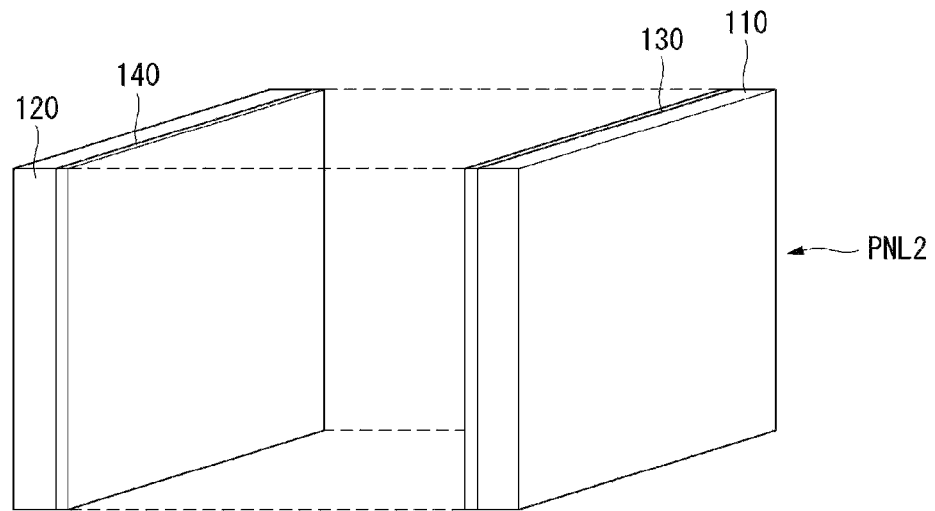
FIG. 7 is a first exemplary view of lower and upper electrodes constituting the lens panel.
Figure 8:
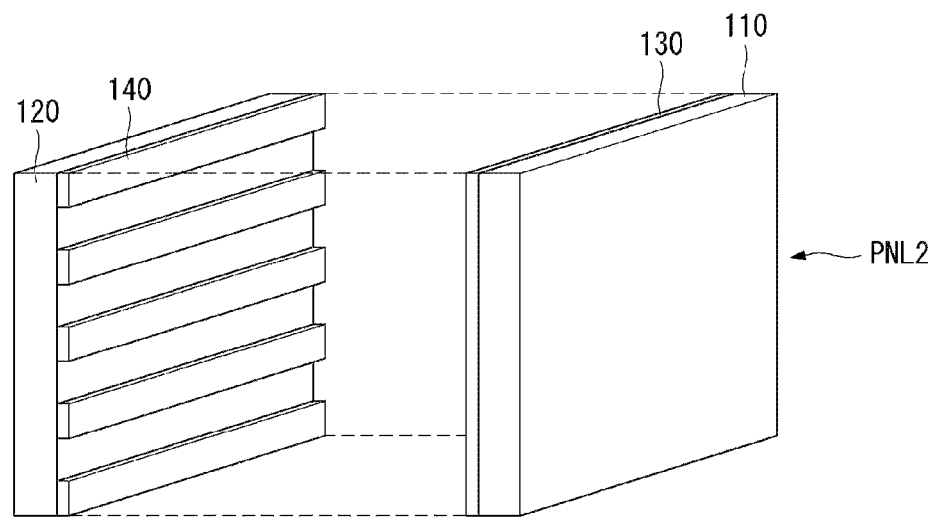
FIG. 8 is a second exemplary view of lower and upper electrodes constituting the lens panel.
Figure 9:
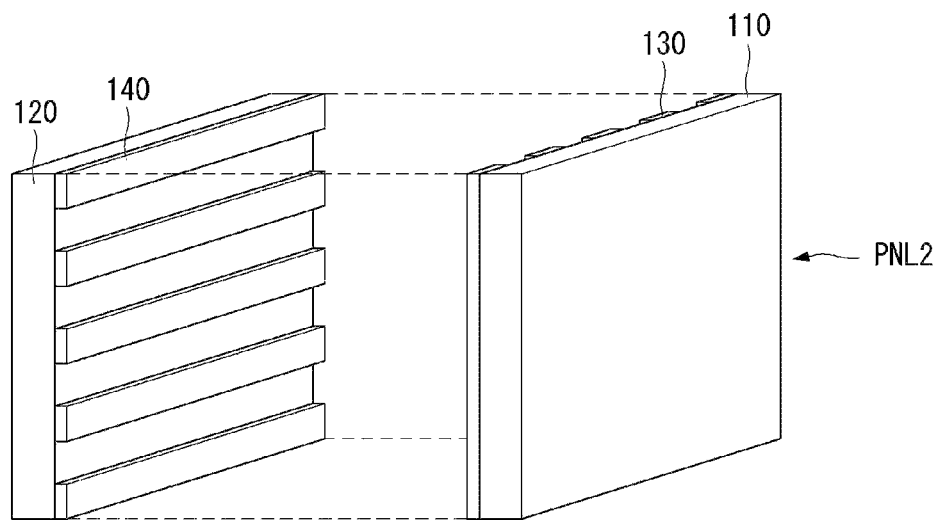
FIG. 9 is a third exemplary view of lower and upper electrodes constituting the lens panel.
Figure 10:
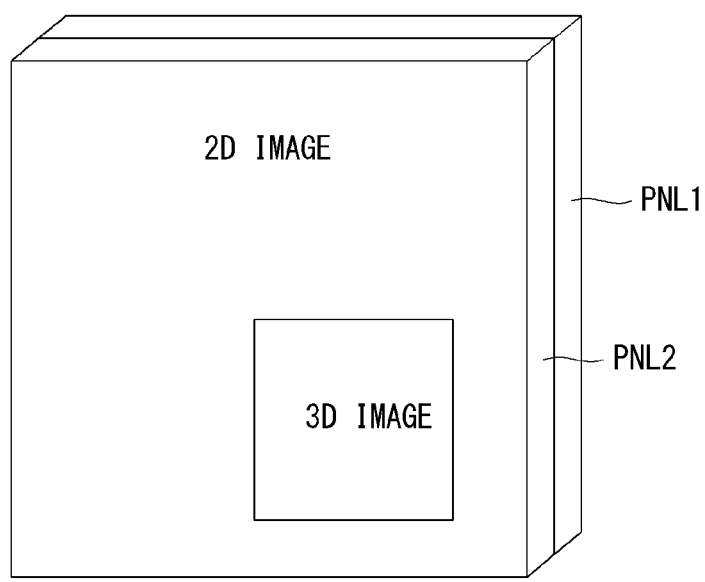
FIG. 10 illustrates display characteristics of a 3D image display device when the structure of FIG. 9 is used.

FIG. 7 is a first exemplary view of lower and upper electrodes constituting the lens panel; FIG. 8 is a second exemplary view of lower and upper electrodes constituting the lens panel; FIG. 9 is a third exemplary view of lower and upper electrodes constituting the lens panel; and FIG. 10 illustrates display characteristics of a 3D image display device when the structure of FIG. 9 is used.

As shown in FIG. 7, the lower electrode 130 and the upper electrode 140 respectively formed on the lower substrate 110 and the upper substrate 120 may be formed in an entire surface electrode type (or whole electrode type) corresponding to the sizes of the substrates.

As shown in FIG. 8, the lower electrode 130 and the upper electrode 140 respectively formed on the lower substrate 110 and the upper substrate 120 may be formed in an entire surface electrode type and a stripe type (or line pattern), respectively. For example, the upper electrode 140 may be formed in a stripe type and the lower electrode 130 may be formed in an entire surface electrode type, or vise versa. Meanwhile, when stripe type of electrodes are formed, the distance between electrodes may be optimally set through an experiment using materials of the lens layer 150 and the electrolyte layer 160 formed in the lens panel PNL2. That is, the distance between electrodes may be varied depending on the materials of the lens layer 150 and the electrolyte layer 160 formed in the lens panel PNL2.

As shown in FIG. 9, the lower electrode 130 and the upper electrode 140 respectively formed on the lower substrate 110 and the upper substrate 120 may be formed in a stripe type. For example, the stripe types of lower electrode 130 and upper electrode 140 may orthogonally intersect each other, but are not limited thereto.

As shown in FIG. 10, a 3D image display device according to an embodiment of the present invention can display both a 2D image and a 3D image by using a display panel PNL1 and a lens panel PNL2. In order to display both the 2D image and the 3D image, the lens panel PNL2 may be formed to have an electrode structure shown in FIG. 9, but is not limited thereto.

Hereinafter, a 3D image display device to which a lens panel according to an embodiment of the present invention is applicable will be described.

Figure 11:
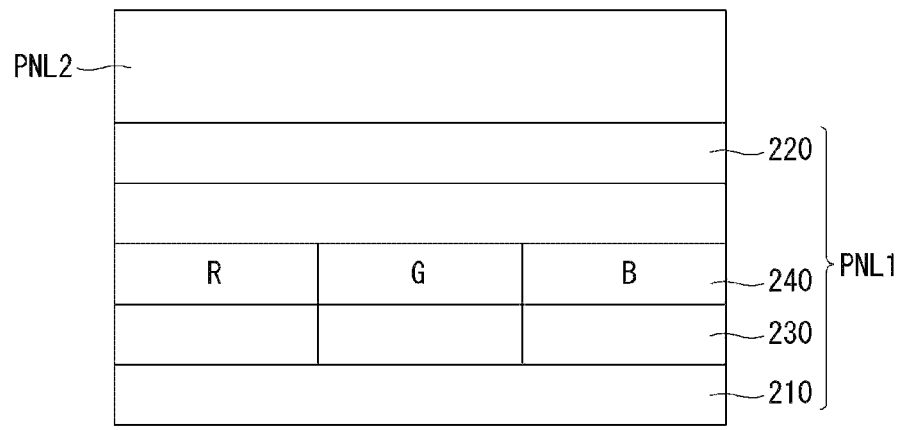
FIG. 11 is a schematic cross-sectional view of a 3D image display device using an Organic Light Emitting-Diode Display (OLED)
Figure 12:
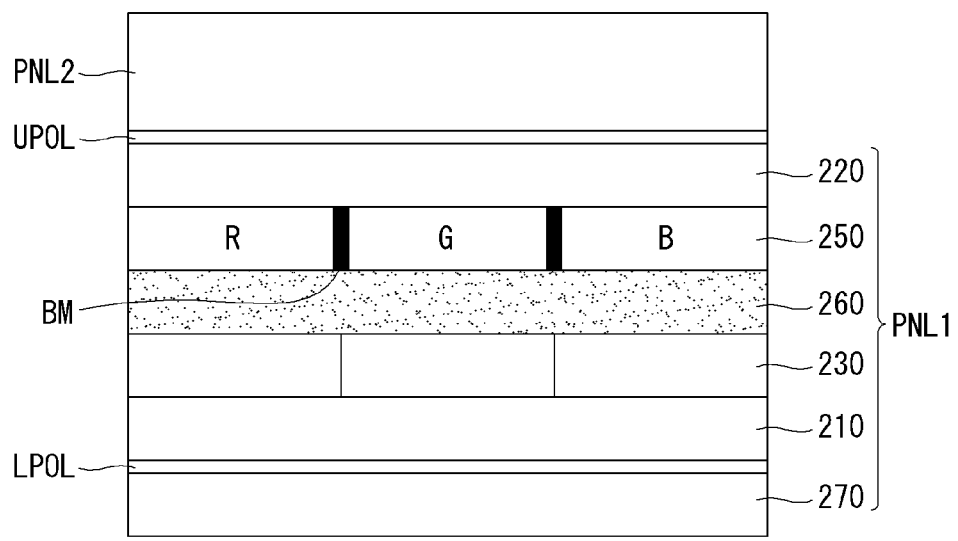
FIG. 12 is a schematic cross-sectional view of a 3D image display device using a Liquid Crystal Display (LCD)
Figure 13:
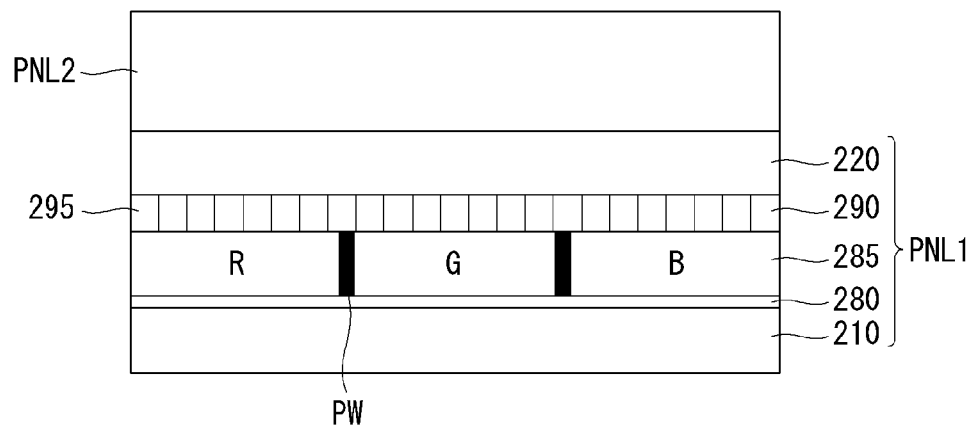
FIG. 13 is a schematic cross-sectional view of a 3D image display device using a Plasma Display Panel (PDP)

FIG. 11 is a schematic cross-sectional view of a 3D image display device using an Organic Light Emitting-Diode Display (OLED); FIG. 12 is a schematic cross-sectional view of a 3D image display device using a Liquid Crystal Display (LCD); and FIG. 13 is a schematic cross-sectional view of a 3D image display device using a Plasma Display Panel (PDP).

As shown in FIG. 11, a lens panel PNL2 is formed on a display surface of an OLED display panel PNL1, which emits a non-polarized light. The OLED display panel PNL1 includes a first substrate 210, a second substrate 220, a thin film transistor array 230, and organic light emitting diodes 240.

The thin film transistor array 230 is formed on the first substrate 210. The thin film transistor array 230 includes data lines, scan lines, switching transistors, driving transistors, and capacitors. Since the thin film transistor array 230 is formed in various types depending on the structure of the thin film transistor, the thin film transistor is simplified and expressed as a block.

The organic light emitting diodes 240 are formed on the thin film transistor array 230. The organic light emitting diodes 240 each include a first electrode, a light emitting layer, and a second electrode. The first electrode and the second electrode are selected as an anode electrode and a cathode electrode or a cathode electrode and an anode electrode. The first electrode is connected to a source electrode or a drain electrode of a driving transistor of the thin film transistor array 230. The second electrode is connected to a high-potential voltage (e.g., VDD) or a low-potential voltage (e.g., VSS). The light emitting layer is formed between the first electrode and the second electrode. The light emitting layer emits red, green, and blue lights. Thus, a light emitting layer included in a red sub-pixel R emits a red light; a light emitting layer included in a green sub-pixel G emits a green light; and a light emitting layer included in a blue sub-pixel B emits a blue light.

Meanwhile, the OLED display panel PNL1 may include a red sub-pixel emitting a red light, a white sub-pixel emitting a white light, a green sub-pixel emitting a green light, and a blue sub-pixel emitting a blue light. In this case, all of the light emitting layers included in the red sub-pixel, the green sub-pixel, and blue sub-pixel emit a white light. In addition, the red, green, and blue sub-pixels further include red, green, and blue color filters converting the white light into red, green, and blue lights, respectively. However, since the white sub-pixel does not need a separate color filter for color conversion, the white sub-pixel emits the white light as it is. That is, a color filter is not present in a region corresponding to the white sub-pixel.

Generally, a circularly polarizing plate may be attached to the display surface of the OLED display panel PNL1. Since the lens panel PNL2 may be also applied to a display panel emitting a non-polarized light, the circularly polarizing plate that is generally attached between the OLED display panel PNL1 and the lens panel PNL2 may be removed.

As shown in FIG. 12, a lens panel PNL2 is formed on a display surface of an LCD display panel PNL1, which emits a polarized light. The LCD display panel PNL1 includes a first substrate 210, a second substrate 220, a thin film transistor array 230, color filters 250, upper and lower polarizing plates LPOL and UPOL, a liquid crystal layer 260, and a backlight unit 270.

The thin film transistor array 230 is formed on the first substrate 210. The thin film transistor array 230 includes data lines, scan lines, switching transistors, and capacitors. Since the thin film transistor array 230 is formed in various types depending on the structure of the thin film transistor, the thin film transistor is simplified and expressed as a block.

The color filters 250 are formed on the second substrate 220 (on an inner surface of the second substrate). The color filters 250 are formed of resins containing red, green, and blue pigments while a black matrix BM is disposed between the color filters 250. Although not shown, an overcoat layer may be further formed to planarize surfaces of the color filters 250. The liquid crystal layer 260 is formed between the first substrate 210 and the second substrate 220. The lower polarizing plate LPOL is formed on a rear surface of the first substrate 210 and the upper polarizing plate UPOL is formed on a display surface of the second substrate 220.

A backlight unit 270 is positioned on the rear surface of the first substrate 210. The backlight unit 270 supplies a light through the rear surface of the first substrate 210. The backlight unit 270 is selected from an edge type in which a light source is positioned at one side of the first substrate 210, a dual type in which a light source is positioned at one side and the other side of the first substrate 210, and a direct type in which a light source is position below the first substrate 210. A light source of the backlight unit 270 is selected from a Light Emitting Diode (LED), a Cold Cathode Fluorescent Lamp (CCFL), and the like.

As shown in FIG. 13, a lens panel PNL2 is formed on a display surface of a PDP display panel PNL1, which emits a non-polarized light. The PDP display panel PNL1 includes a first substrate 210, a second substrate 220, address electrodes 280, sustain electrodes 290, and scan electrodes 295.

The address electrodes 280 are formed on the first substrate 210. The address electrodes 280 are insulated by a lower dielectric layer. The sustain electrodes 290 and the scan electrodes 295 are spaced apart from each other on the second substrate 220. The sustain electrodes 290 and the scan electrodes 295 are insulated by an upper dielectric layer. The address electrodes 280 are disposed to orthogonally intersect the sustain electrodes 290 and the scan electrodes 295.

Discharge layers 285 are formed between the address electrodes 280 and the sustain electrodes 290 and the scan electrodes 295. The discharge layers 285 are demarcated by partition walls PW. The discharge layers 285 are classified into red discharge layers R, green discharge layers G, and blue discharge layers B according to the fluorescent layers formed therein. The partition walls PW are formed in one of a stripe type, a well type, a delta type, and a honeycomb type to define discharge cells, in which a discharge gas is included.

As described above, a 3D image display device according to an embodiment of the present invention can be applied to OLED and PDP display panels emitting a non-polarized light and an LCD display panel emitting a polarized light, and may be also applied to other display panels.

Meanwhile, each of the lens panels PNL2 shown in FIGS. 11 to 13 may use the second substrate 220 of the display panel PNL1 positioned below as a lower substrate thereof for thinning of the panel.

Hereinafter, a schematic driving method of a 3D image display device according to an embodiment of the present invention will be described. However, the operation of the 3D image display device in a 2D mode and a 3D mode will be described as one example, again referring to FIG. 14 and FIG. 1 for better understanding.

Figure 14:
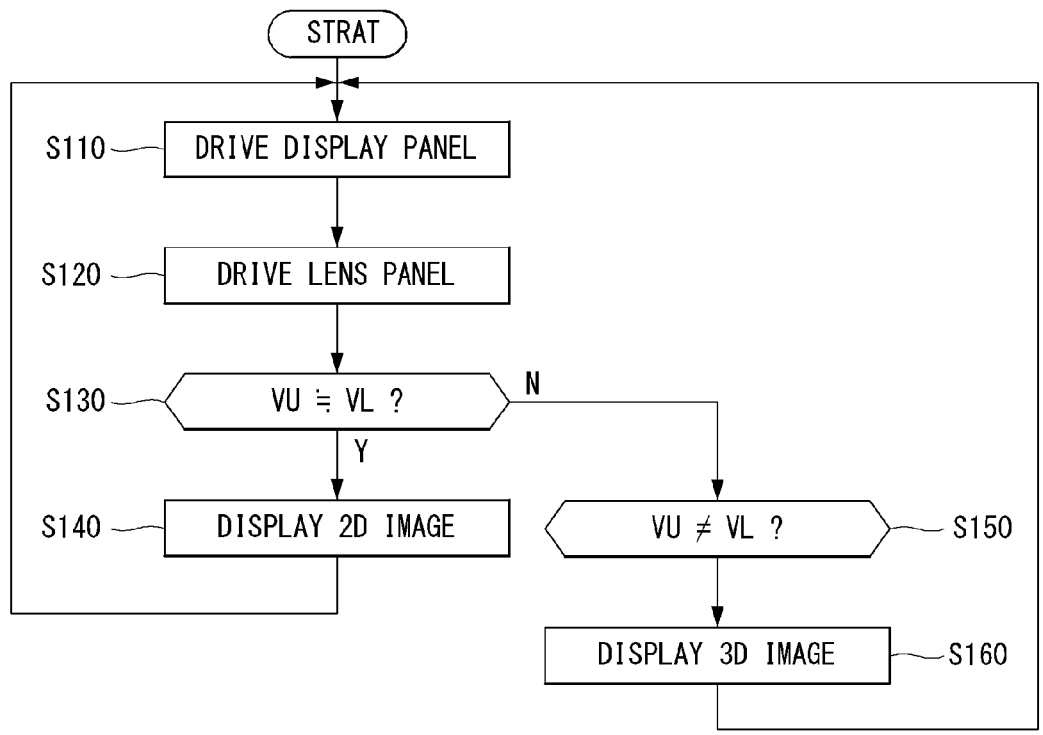
FIG. 14 is a flowchart illustrating a schematic driving method of a 3D image display device according to an embodiment of the present invention.

FIG. 14 is a flowchart illustrating a schematic driving method of a 3D image display device according to an embodiment of the present invention.

As shown in FIGS. 1 and 14, when a user turns on a 3D image display device, the 3D image display device is driven. Here, the image supplier SBD, the timing controller TCN, the display panel driver DRV1, the lens panel driver DRV2, the display panel PNL1, and the lens panel PNL2 start to be operated at an initial driving mode necessary for operation.

The display panel PNL1 is driven to display an image (S110). The display panel PNL1 is driven by the image supplier SBD, the timing controller TCN, the display panel driver DRV1, and the like, to display an image.

The lens panel PNL2 is driven to transmit the image displayed on the display panel PNL1 (S120). The lens panel PNL2 is driven by the timing controller TCN, the lens panel driver DRV2, and the like, and transmits the image displayed on the display panel PNL1.

The user using the 3D image display device selects a 2D image mode through a user interface. Here, the driving voltages VU and VL output through the lens panel driver DRV2 satisfy VU≈VL (S130), and thus the lens panel PNL2 transmits the image displayed on the display panel PNL1, as it is, to display a 2D image (S140).

The user using the 3D image display device selects a 3D image mode through a user interface. Here, the driving voltages VU and VL output through the lens panel driver DRV2 satisfy VU≠VL (S150), and thus the lens panel PNL2 divides the image displayed on the display panel PNL1 into a left-eye image and a right-eye image and then transmits the left-eye image and the right-eye image, thereby displaying a 3D image (S160).

As set forth above, according to the present invention, the lens panel formed of materials having refractive indexes varying depending on the oxidation-reduction reaction is used, thereby simplifying the panel structure when the glasses-free 3D image is implemented. Further, the lens panel is applicable to the display panel emitting a polarized light or non-polarized light, thereby realizing general-purpose 3D image display devices.

What is claimed is:

1. A three-dimensional (3D) image display device, comprising:
    a display panel displaying an image;
    a lens panel positioned on the display panel, the lens panel comprising:
        a first electrode and a second electrode positioned opposite the first electrode;
        a lens layer composed of a lenticular type of conductive polymer, the lens layer positioned between the first electrode and the second electrode; and
        an electrolyte layer directly on the lens layer, the electrolyte layer composed of an electrolyte; and
    a lens panel driver supplying a first driving voltage to the first electrode and a second driving voltage to the second electrode of the lens panel;
    responsive to one of the first driving voltage or the second driving voltage swinging from a first potential to a second potential, the other driving voltage is maintained at a potential equal to the first potential during a 3D mode of the 3D display device or the other driving voltage is maintained at a potential equal to the second potential during a two-dimensional (2D) mode of the 3D display device;
    wherein during the 3D mode of the 3D display device, the lens panel driver generates a voltage difference in the first driving voltage and the second driving voltage by outputting the first driving voltage at the first potential and the second driving voltage at the second potential and switching by a frame unit of at least N, where N is an integer of 1 or greater, to outputting the first driving voltage at the second potential and the second driving voltage at the first potential;
    wherein a refractive index of the lens layer and a refractive index of the electrolyte layer are varied according to the first driving voltage and the second driving voltage supplied to the lens panel.

2. The 3D image display device of claim 1, wherein the lens panel further comprises:
    a first substrate;
    a second substrate spaced apart from the first substrate and facing the first substrate
    wherein the first electrode is formed on the first substrate and the second electrode is formed on the second substrate and facing the first electrode;
    the lens layer formed on the first substrate.

3. The 3D image display device of claim 2, wherein the lens panel refracts a light incident from the display panel when a voltage difference is generated between the first driving voltage supplied to the first electrode and the second driving voltage supplied to the second electrode, and emits a light incident from the display panel when a voltage difference is not generated between the first driving voltage supplied to the first electrode and the second driving voltage supplied to the second electrode.

4. The 3D image display device of claim 2, wherein the first electrode and the second electrode are formed in an entire surface electrode type according to sizes of the first substrate and the second substrate.

5. The 3D image display device of claim 2, wherein one of the first electrode and the second electrode is formed in an entire surface electrode type according to the size of the corresponding substrate, and the other is formed in a stripe electrode type.

6. The 3D image display device of claim 2, wherein the first electrode and the second electrode are formed in a stripe electrode type according to sizes of the first substrate and the second substrate.

7. The 3D image display device of claim 2, wherein the lens layer has a first refractive index and the electrolyte layer has a second refractive index when the driving voltage is not supplied to the lens panel, the second refractive index smaller than the first refractive index.

* * * * *